UNITED STATES PATENT OFFICE.

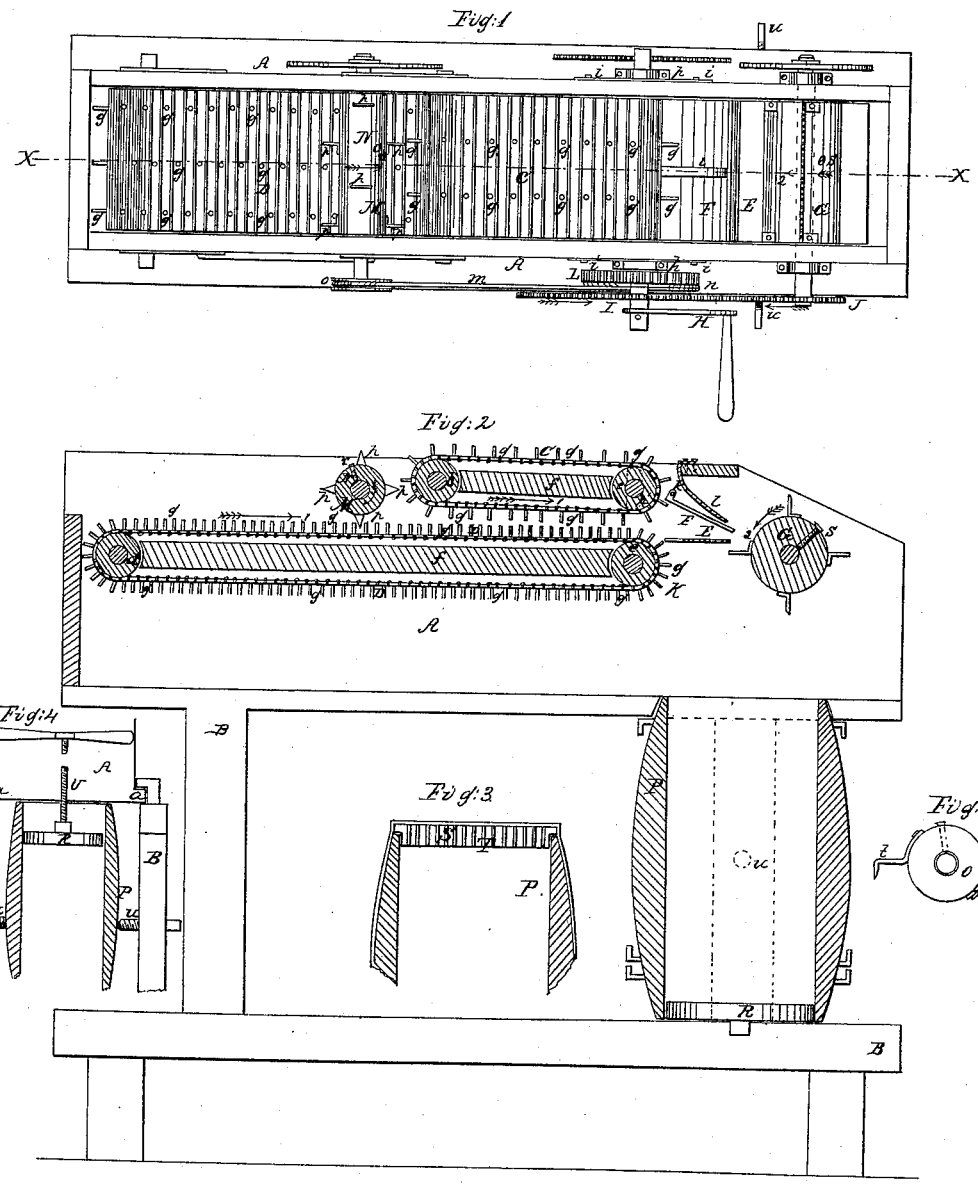

F. B. HUNT, OF WESTFIELD, INDIANA.

MILL FOR GRINDING APPLES AND OTHER SUBSTANCES.

Specification of Letters Patent No. 9,876, dated July 26, 1853.

*To all whom it may concern:*

Be it known that I, F. B. HUNT, of Westfield, in the county of Hamilton and State of Indiana, have invented certain new and useful Improvements in Cider-Mills, which improvements may also be applied to straw-cutters, cabbage-cutters, and like machines; and I do hereby declare that the following is a full, clear, and exact description of the construction and operation of the same, reference being had to the annexed drawings, making a part of this specification, in which—

Figure 1, is a plan or top view of my improved cider mill. Fig. 2, is a longitudinal vertical section of ditto taken at the line X, X, Fig. 1. Fig. 3, is a vertical section of the end of the cylinder in which the perforated cap or head is placed. Fig. 4, is a front view of a portion of the frame, cylinder with screw attached, and the box or case which contains the grinder or cutter, and endless belts. Fig. 5, is an end view of a cutter used in certain cases which will be hereafter described.

Similar letters of reference indicate corresponding parts in each of the several figures.

The nature of my invention consists: 1st, in the employment or use of two endless belts, a stationary and movable one. Said belts having spurs or teeth upon them and arranged in a manner which will be hereafter fully described by which as the belts are operated, apples, straw, cabbages and other articles or substances may be fed to the cutters, the belts being so arranged as to be adjustable and convey or feed to the cutter any substance or vegetable usually cut by agricultural implements.

2nd. My invention consists in the employment or use of the endless belts in combination with one or more cutters arranged as will be hereafter described, by which combination and arrangement any substance or article usually cut by agricultural implements may be cut as desired, my implement thus effecting what now requires several distinct implements to perform.

To enable others skilled in the art to make and use my invention, I will proceed to describe its construction and operation.

A, represents a rectangular case or box the bottom of which has cleats (*a*) (*a*) Fig. 4, attached to its sides, said cleats fitting in grooves in the top rails of a frame B, see Fig. 4. This case or box A, by means of the cleats fitting in the grooves may be moved longitudinally on the frame B, either backward or forward as desired. The object in having the case or box movable will be hereafter shown.

C, D, are two endless belts, the upper belt C, passes over the rollers (*b*) (*c*) and the lower belt D, over the rollers (*d*) (*e*) see Fig. 2, between each pair of rollers there is a board (*f*) these boards prevent the belts from sagging or being too much depressed when any weight or pressure is upon them. The lower belt D, is about double the length of the upper belt C, consequently the back part of the case or box A, directly behind the upper belt C, is the hopper; the article or substance to be cut being thrown on the back part of the lower belt. Each belt is provided with spurs or teeth (*g*); the upper belt has two rows, and the lower belt three rows, on the upper belt two spurs or teeth are placed in every alternate link or slat of the belt, on the lower belt two spurs or teeth are placed in every alternate link or slat, and a single spur or tooth in the intervening links or slats, see Fig. 1.

It may be proper to state that the belts are formed of links or slats connected or jointed in any proper manner either by rods or hooks. The lower belt D, is stationary, that is, its rollers *d*, *e*, are not adjustable, their axes always remaining in the same position; but the upper belt C, is adjustable, that is, the axis of the roller C, may be elevated or depressed so as to allow the space between the two belts to be greater or less as desired. At all times however the space between the two belts at the end where the rollers (*c*) (*e*) are placed is smaller than the space between the belts directly under the roller (*b*) see Fig. 2, because the rollers (*b*) (*c*) of the upper belt are not hung in a line perfectly horizontal. This should be so as the substance to be cut enters between the belts at the widest space directly under the roller (*b*) and passes out at the smallest space between the rollers (*c*) (*e*). The ends of the axis of the roller (*c*) pass through slots (*j*) in the sides of the case or box, see dotted lines Fig. 2, the bearings (*h*) see Fig. 1, being on the outer sides of the case or box and secured there by set screws (*i*) Fig. 1. In order therefore to make the space between the rollers (c) (e) greater or less, all that is required is to unscrew the set screws (i) and elevate or depress the bearings (h) this will be readily understood as it is a familiar mode of arranging adjustable rollers. The belts move in the direction indicated by the arrows 1, 1, see Fig. 2. At the end of the lower belt D, and at the upper part of the roller (e) there is a stationary horizontal plate E, Figs. 1, and 2, the sides of which are secured to the case or box A. Directly over this stationary plate E, there is a movable inclined plate F, hung on pivots (k) see Fig. 2, in the sides of the case or box A, the lower end of the movable inclined plate F, rests upon the stationary plate E. A spring (l) bears upon the inclined plate and keeps it down upon the stationary plate, see Fig. 2. In front of the plates E, F, a cutting cylinder G, is placed, the knives of which, as the cylinder revolves pass close to the edges of the plates, and cut the substance or article that is fed along between the belts and plates to the knives.

The mode in which the belts operate or feed will be readily seen.

The article or substance to be cut is thrown or placed upon the back part of the lower belt D, and the two belts moving in the direction as indicated by the arrows 1, 1, the article or substance is carried between the two belts C, D, the spurs or teeth (g) serving as holders, the belts also forcing the article or substance between the plates E, F, the upper inclined plate F, being raised, the force of the substance or article as it passes out from between the plates overcoming the action of the spring (l) and being cut at the edges of the plates by the knives as the cylinder G, revolves. The belts being thus arranged and operating as described will feed in a perfect manner all articles or substances now cut by the various agricultural implements in present use, for instance, apples, straw, cabbages, beets, turnips, et cetera, et cetera, this is evident because it is well known that there is no better mode of conveying or feeding than by belts, they are in use in almost all classes of machinery and have not been superseded. Now by arranging the belts as described, a movable and stationary one, I accommodate the belts to feed the various articles, for straw cutting, the belts are brought rather near together, that is, the ends which pass over the rollers (c) (e). For apples they are placed rather farther apart, and farther still for beets, turnips, cabbages et cetera, et cetera.

Motion is communicated to the belts C, D, and cutter G, in the following manner: A driving pulley on a crank H, Fig. 1, is placed on the axis of the pulley (e) on this same axis is placed a spur wheel I, which meshes into a pinion J, on the axis of the cutter. There is also on the axis of the pulley (e) a toothed wheel K, see dotted lines in Fig. 2, which meshes into a toothed wheel L, on the axis of the pulley (c). Thus it will be seen that by turning the crank H, motion is given the belts C, D, and cutter G, in the direction indicated by the arrows 1, 1, and 2, see Fig. 2. It will be seen that by adjusting the upper belt C, different sized wheels L, will be required because the axis of the pulley (c) is changed as occasion requires, for instance, if the wheel L shown in Fig. 1, meshes into the toothed wheel K, on the axis of the pulley (c) when the belt C, is adjusted for feeding straw, and the two belts consequently near together, a larger wheel will be required when the pulley (c) is elevated and the belts placed farther apart. Different sized wheels are therefore provided and adjusted to the axis of the pulley (c) as required.

Different sized wheels L are required for the purpose of bringing the discharging edge of the belts C and D near together or far apart so that the two belts may feed or convey different sized articles to the cutters.

M, is a cutter placed directly back of the upper belt C, and over the lower belt D, see Figs. 1, and 2. This cutter is driven by a band (m) which passes around a pulley (n) adjoining the spur wheel I, and around a pulley o, on the axis of the cutter. The cutter is formed of small teeth or knives (p) projecting from the periphery of a cylinder N. This cylinder as well as the cylinder of the cutter G, fits loosely on its axle and is secured thereon by a set screw (v). (s) is the set screw of the cutter G. By this arrangement different cylinders with cutters may be employed, for instance, for cutting straw, a cylinder O, like that represented in Fig. 5, would be used, the knives or blades projecting at right angles from their shanks which are secured to the cylinder.

One or more cutters or rather cylinders, with cutters upon their peripheries may be employed as occasion requires, when small articles are cut probably one will be sufficient, but for large articles as cabbages, turnips, beets et cetera, both cutters will be necessary.

I do not claim the employment of the endless belts irrespective of their arrangement, as they have been long used, neither do I claim the cutters nor cylinder press separately. But

What I claim as new, and desire to secure by Letters Patent, is—

1. The employment or use of the endless belts C, and D, arranged as described, videlicet, the upper belt C, having an adjustable roller (c) which upon being elevated or depressed causes the belts at the discharge ends to be brought nearer together or separated farther apart, thus allowing the belts to be adjusted to feed or convey to the cutters, all the different articles or substances which at present require each a separate and distinct machine.

2. I claim in combination with the two endless belts arranged as described one or more cutters or cutting cylinders G, M, said cylinders being placed loosely on their axes and secured by set screws as herein described by which several forms of cutters may be used according to the work required to be performed.

F. B. HUNT.

Witnesses:
   H. G. KENYON,
   O. H. BROWN.